United States Patent
Feudo et al.

(10) Patent No.: US 9,674,163 B1
(45) Date of Patent: *Jun. 6, 2017

(54) METHOD FOR PAYLOAD ENCRYPTION OF DIGITAL VOICE OR DATA COMMUNICATIONS

(71) Applicants: Christopher V. Feudo, Fairfax Station, VA (US); Thomas J. Zacharkevics, Fairfax Station, VA (US)

(72) Inventors: Christopher V. Feudo, Fairfax Station, VA (US); Thomas J. Zacharkevics, Fairfax Station, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/014,441

(22) Filed: Aug. 30, 2013

Related U.S. Application Data

(63) Continuation of application No. 12/126,539, filed on May 23, 2008, now Pat. No. 8,526,616.

(51) Int. Cl.
*H04L 29/06* (2006.01)
*H04L 9/32* (2006.01)

(52) U.S. Cl.
CPC .......... *H04L 63/0464* (2013.01); *H04L 9/321* (2013.01); *H04L 9/3263* (2013.01); *H04L 63/166* (2013.01); *H04L 2209/80* (2013.01)

(58) Field of Classification Search
CPC ..... H04L 63/065; G06F 21/128; G06F 21/602
See application file for complete search history.

(56) References Cited

U.S. PATENT DOCUMENTS 6,907,123 B1 * 6/2005 Schier ............... H04K 1/00
370/335
7,852,783 B2 * 12/2010 Tasker ............... H04L 63/0428
370/252

(Continued)

FOREIGN PATENT DOCUMENTS

WO 2005/109923 11/2005

OTHER PUBLICATIONS

Clark, David D., Scott Shenker, and Lixia Zhang. "Supporting real-time applications in an integrated services packet network: Architecture and mechanism." ACM SIGCOMM Computer Communication Review. vol. 22. No. 4. ACM, 1992.*

(Continued)

*Primary Examiner* — Shawnchoy Rahman

(57) ABSTRACT

A security platform or network for transmitting end-to-end encrypted voice or data communications between at least a first digital device and a second device is disclosed. The network includes a network portal for registering the first digital device and the second device. The portal provides the first digital device and second device with at least first and second keys and receives requests from each device to communicate with each other. The portal searches for and receives authorization from the called device to set up a secure session with the calling device. The portal receives encrypted messages from the devices, decrypts the encrypted messages with the keys provided to the devices, and re-encrypts the received messages. The portal sends the re-encrypted messages to the other device. Accordingly, the (Continued)

devices are capable of securely communicating with each other by encrypting and decrypting the messages sent to and received from the portal. The intent is to provide a commercially feasible approach to protect sensitive information that is not government classified, with potential users including (a) Individuals—for protecting private information and conversations; (b) Companies—for protecting proprietary/sensitive information; and (c) Government—for protecting SBU conversations and information.

3 Claims, 5 Drawing Sheets

(56) References Cited

U.S. PATENT DOCUMENTS

| | | | |
|---|---|---|---|
| 7,953,070 B1 * | 5/2011 | Agarwal | H04M 7/0078 370/352 |
| 2002/0094081 A1 * | 7/2002 | Medvinsky | H04L 63/0457 380/44 |
| 2003/0014488 A1 * | 1/2003 | Dalal | H04L 29/06 709/204 |
| 2004/0007121 A1 | 1/2004 | Graves et al. | |
| 2004/0158704 A1 * | 8/2004 | Oates | H04L 63/061 713/151 |
| 2004/0184096 A1 * | 9/2004 | Choi | H04N 1/00127 358/1.15 |
| 2006/0059229 A1 * | 3/2006 | Bain | G01C 21/26 709/205 |
| 2007/0195955 A1 | 8/2007 | Cochran et al. | |
| 2008/0084982 A1 * | 4/2008 | Chatterjee | H04M 3/42008 379/201.01 |

OTHER PUBLICATIONS

Brandau, Markus Albert. "Implementation of a real-time voice encryption system." (2008).*

* cited by examiner

METHOD FOR PAYLOAD ENCRYPTION OF DIGITAL VOICE OR DATA COMMUNICATIONS

This application claims the benefit of our United States provisional patent application entitled "Method for Encrypting Wireless or terrestrial Voice Communications", filed Mar. 18, 2008 and assigned Ser. No. 61/037,519, which is incorporated by reference herein.

FIELD OF THE INVENTION

The present invention relates generally to enhanced digital/IP security protection for Sensitive But Unclassified (SBU), proprietary and sensitive information, and more specifically to a digital device utilizing algorithms which provide secure encryption for a signal transmitted over a voice, data and/or communication link, cell phone, laptop or other electronic device that transmits a digital signal. Even more specifically, the present invention relates to an enhanced interoperable wireless or cell phone security system for sensitive but unclassified (SBU) digital traffic transmissions, utilizing payload encryption technologies and optional header modulation. The approach is intended to be commercially feasible, cost effective and affordable; provide ease of use, acceptable latency, and software which is installed directly to a device's allocated memory module without the need for a user to acquire new hardware; does not require excessive use of network resources; and does not require use of excessive amounts of payload bandwidth

BACKGROUND OF THE INVENTION

Wireless voice and data transmissions are vulnerable to eavesdropping and/or interception, and such interception is technically simple and difficult to detect. Not only are voice transmissions easy to monitor (even on digital networks), but the eavesdropper can also determine a target's mobile phone number while the transmission bounces between cellular tower sites. The potential market for security enhancements is extremely large, with potential users such as: (a) individuals who require privacy or want to protect confidential information such as account numbers; (b) businesses that want to protect proprietary or sensitive information; and (c) wireless device owners that have their monthly expenses paid directly or indirectly by the US government or its contractors and are required to add a security service. The intent is to encrypt "sensitive but unclassified" (SBU) voice and data, without requiring expensive techniques or special hardware. The approach is entirely software-based, and encryption can be implemented as a simple software upgrade to existing wireless devices. The potential market base includes (a) Individuals—for protecting private information and conversations; (b) Companies—for protecting proprietary/sensitive information; and (c) Government—for protecting SBU conversations and information.

It is known in the art, that a digital signal transmitted between a digital device and a base station can be encrypted to prevent or minimize interception by an unauthorized listener. While it may be possible to secure the radio frequency (RF) link between the digital device and the base, these techniques are totally inadequate, when the voice or data sent over the RF link is transmitted beyond the base station, which is the normal situation. In these known systems, the voice or data is encrypted by the digital device and decrypted at the base station and vice versa. The base station then transmits the voice or data over a packet switched network (PSN), such as the Internet, or transmitted over a public switched telephone network (PSTN). Once the voice or data is decrypted at the base station, digital access point, the voice or data is transmitted unencrypted to the caller or terminating party. In other words, the information or voice or data is encrypted only on the RF link, and the information or voice or data is not encrypted end-to-end, i.e., all the way from the calling party to the called party.

In order to provide end-to-end encryption, organizations like the Department of Defense (DoD) need a better solution. DOD personnel are currently buying commercial off the shelf (COTS) cell phones to frequently communicate with sensitive but unclassified (SBU) information, but without the appropriate level of security as a protective measure. There is a need for the carriers to offer a secure end-to-end option to DoD and other users, and the solution should preferably be implemented as a software upgrade to a user's existing cell phone or other digital device. Without cost effective digital security integrated as a service for voice and data, the DoD workforce and others are transmitting valuable sensitive information over the airwaves unprotected that could result in negative consequences.

Today one of the most popular emerging technologies is Voice over IP (VoIP). Protocols which are used to carry voice signals over the IP network are commonly referred to as "Voice over IP" or "VoIP" protocols. VoIP operates by packetizing voice or data from one machine, sending this voice or data over a network to another machine, and recreating the voice or data as an audio signal. VoIP is popular because it is cost effective and flexible to the user. VoIP is cost effective because users can use their existing voice or data network connections to also carry VoIP voice or data without incurring any additional costs. VoIP is flexible because VoIP allows a user to utilize their communications device anywhere in the world. All that is needed is a connection to a network and a user can send and receive calls. Most VoIP technologies do not provide any kind of encryption security through proven encryption protocols. Because of this shortcoming, VoIP communications, like digital communications, are highly susceptible to eavesdropping.

SUMMARY OF THE INVENTION

A method, system and computer program for transmitting end-to-end encrypted voice and data communications between digital devices, are disclosed. The digital devices are registered at a portal on a network, and the portal provides the digital devices with keys. The portal receives a request from any of the registered digital devices to set up a call with another digital device. The portal searches for the digital device being called, and when found, the portal requests authorization from the digital device being called to set up a secure session with the calling digital device. When authorization is obtained, the portal sets up the call and the portal receives an encrypted messages from the calling digital device. The portal decrypts the messages from the calling digital devices with the key provided to the digital device. The portal then re-encrypts the received message and sends the re-encrypted message to the terminating or called digital device where it is decrypted. Encrypted messages are sent in the reverse direction from the called digital device to the calling digital device. Accordingly, the digital devices are capable of securely communicating with each other by encrypting and decrypting the messages sent to and received from the portal. The particular portal in this case is referred as the "Cathedral Portal".

DETAILED DESCRIPTION

Figure 1:
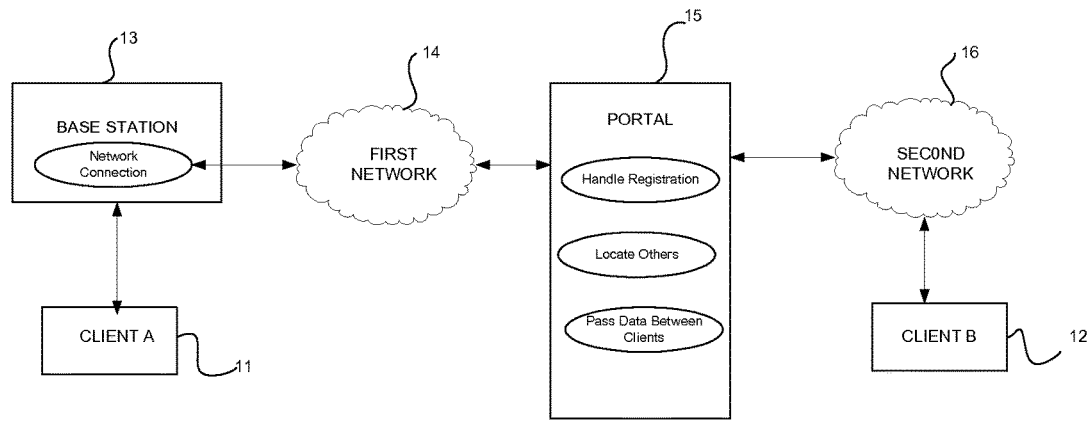
FIG. 1 is a general block diagram of a network associated with the present invention.

The present invention provides an enhanced cost effective means of protection for COTS cell phones from malicious eavesdroppers. The system is interoperable across U.S. cell phone carriers and is intended by design to be interoperable between international carriers. The present invention can also be implemented on any of the following devices, systems or standards including, but not limited to: TDMA, GSM, CDMA, iDEN, Cell Phones, Satellites, Pagers, PDA's, Video Transmissions, Radios, Email Systems, Wireless Laptops, BlueTooth/WiFi, Wireless LANs (IEEE 802 standards), or Voice Over IP. It should be noted that the present invention is preferably implemented with an executable software program loaded onto the devices and the devices preferably require no additional hardware or hardware modification. The main software component associated with providing this security is payload encryption via the Advanced Encryption Standard (AES) or other encryption algorithm, and an optional header modulation component may also be implemented in conjunction with the payload encryption component to further improve security.

The software architecture of the present invention preferably includes a concrete layer and a plurality of abstract layers with various and different software components or modules associated with the abstract layers. A system and method that utilizes this architecture of a concrete layer and a plurality of abstract layers is described in U.S. Patent Publication 2003/0007121, entitled "System and Method for Reuse of Command and Control Software Components", by Graves et al. The entire contents of U.S. Patent Publication 2003/0007121 are incorporated herein by reference.

The present invention preferably relies upon AES for its standard encryption component, yet it has stub code to make the technology encryption agnostic (e.g., able to use on-the-fly key management exchanges for AES, DES, Blowfish, etc.). AES is used to encrypt the payload voice or data. Deployment of this system also preferably includes a way to push new encryption algorithms out to a device on a group or geographic basis rather than on a per user basis.

The present invention is applicable to cell phones and other digital devices as well. It should be noted that although the invention is described in terms cell phones, wireless devices, or terrestrial devices, the present invention is applicable to any type of digital communications device, and the use of the term digital communications device includes all type of wireless and terrestrial devices.

An object of the present invention is to provide "commercially feasible security", protecting sensitive but unclassified information/voice or data, which translates to National Security Agency Type 2 security. This includes payload security as protection against eavesdroppers, as well as, optional header modulation as protection against hackers and/or crackers and state sponsored adversaries by providing the denial of traffic analysis.

In order to provide effective Type 2 security, which is effective commercially feasible security, the present invention utilizes encryption and authentication models that have been proven and are freely available. It should be noted that the present invention is also applicable to Type I, III or other level of security. For example, some appropriate tools for use with the present invention include:

Advanced Encryption Standard—AES is preferably used to provide fast, secure encryption of voice or data information. AES is a NIST (National Institute of Standards and Technology) approved cipher protocol and also meets DOD (Department of Defense) standards to encrypt secret and top secret information (top secret when using a 256 bit key), which the invention utilizes.

One Time Pad—A one-time pad may be used to wrap the AES encrypted payload. A one-time pad is a very simple yet completely unbreakable symmetric cipher. "Symmetric" means it uses the same key for encryption as for decryption. As with all symmetric ciphers, the sender must transmit the key to the recipient via some secure and tamperproof channel, otherwise the recipient won't be able to decrypt the ciphertext.

The key for a one-time pad cipher is a string of random bits, usually generated by a cryptographically strong pseudo-random number generator (CSPRNG).

Digital Certificates—A digital certificate is preferably used to identify end users and verify the authenticity of messages received.

To provide end-to-end secure transmission, voice or data needs to be encrypted from the source all the way to the destination. Using the above tools secure transmission of voice or data including VoIP can be achieved, however, because VoIP allows user to connect and disconnect from various networks, it is difficult to locate an end user without some service to find them. This problem can by solved if a user communicates through a portal. The primary function of the portal is to handle registration by authenticating individual's identities, locate other authenticated user, authorize users and pass information between registered users through a secure channel Communicating through the portal also hides the identity of the end user. The only thing that an observer can see is that a user has an encrypted channel. Alternatively, the portal can be eliminated from the system and a secure communication can be established end-to-end between the registered users with the users communicating as peer to peer devices, or one client acting as a server and the other client acting as a client.

Referring now to FIG. 1, a block diagram illustrates the general call flow of the present invention. The call flow, which is transparent to the user, is as follows. A digital device 11 or Client A registers with a portal 15 which sets up a call and establishes dynamic sessions. The portal 15 authenticates the identity of Client A, and if Client A is authenticated, Client A receives a key from the portal 15. It should be noted that the key distribution can be on a one time basis or on a per session basis. If desired, the keys can be changed at any time including during the middle of a session. At the conclusion of a session or at the appropriate time, the keys or other information relating to a session can be deleted. The keys may include key lengths of 256 bits, 512 bits or above.

In addition, the portal 15 is designed to be redundant and is intended for 100% uptime. During call set up, the portal 15 is responsible for authentication, authorization, and registration of the clients. The portal 15 can also perform other functions in addition to call set up. For example, the portal 15 can be designed to handle billing/tracking of services. The portal 15 can also serve as a central distribution point for router updates and key exchange management. The portal can also help the system to monitor quality of service and to increases the difficulty of malicious traffic analysis.

Client A requests the portal 15 to call another digital device 12 or Client B. The server at portal 15 locates Client B and sets up a secure channel to Client B. Client A and Client B can then communicate. Either client can notify the portal 15 that the conversation is done and the portal 15 stops routing communication traffic. If either client deregisters with the portal 15, the portal 15 is no longer able to find the client for the other user.

Continuing to refer to FIG. 1, the initial step of a call setup is the registration process, which is also preferably transparent to the user. The registration process includes a calling digital device 11 or Client A registering with the portal 15 (Proxy), in order for others to locate the digital device 11. The calling digital device 11, for example, requests a connection to talk with the other called digital device 12 or Client B and the portal 15 sets up communications. If the called digital device 12 is found, the portal 15 sets up a secure channel for communication. Otherwise, the portal 15 notifies the calling digital device 11 that the other called digital device 12 was not found. If the called digital device 12 is found, the portal 15 handles the communication. Either the digital device 11 or 12 can disconnect the communication. Lastly, the digital device 11 or 12 leaves (deregisters) from the portal 15, and at this point the digital device is no longer reachable by any other digital device.

A more detailed description of how a call is implemented from the first digital device 11 of Client A to second digital device 12 of Client B will now be provided. It should be noted that digital devices 11, 12 can include a cell phone, PDA, computer or any other type of communications device. Client A of digital device 11 places a call through the base station 13. The base station 13 may be a cell phone tower, Wi-Fi access point, etc. depending upon the type of digital device 11, 12 that is used to implement the call. The call from digital device 11 is routed from the base station 13 through a first network 14 to the portal 15. The portal 15 looks up the Client B of digital device 12. The functions of the portal 15 include the handling of registration, location of others and passage of information between two users. If Client B of digital device 12 is identified as positive, then the call is sent encrypted to the digital device 12 via a second network 16 via a base station 17, if Client B is a wireless device. When the called party or user of digital device 12 is alerted of the incoming transmission, Client B can either accept or not accept the encrypted call. Client A of digital device 11 will receive a message indicating whether Client B is willing to accept an "encrypted call" or "non-encrypted call" or whether Client B is unavailable.

Continuing to refer to FIG. 1, a description of a VoIP embodiment, which is also preferably transparent to the user, will now be explained utilizing a typical scenario. In this scenario, a Client A may be connected to the Internet using through a WiFi (802.11x) access point 13 using a WiFi enabled device such as a PDA (Personal Digital Assistant). Client A wants to communicate via the network 14 (the Internet) with Client B who is already registered with the portal 15 which is also connected to the Internet. In this scenario Client A is described as being connected to the Internet via a WiFi access point, but the architecture of the present invention is not limited to an Internet WiFi connection and can work with other Internet connections such as Local Area Networks (LANs), Wide Area Networks (WANs) or any IP compatible network.

Client A first connects to the server of the portal 15 to register. The server of portal 15 authenticates Client A. The portal 15 decrypts the call and verifies the signature using a digital certificate of Client A. If the information is valid, the portal 15 adds the information of Client A, which can be used by others for location. If the information is not valid, the portal 15 will ignore Client A. Now that Client A is authenticated, the server hands out a key for Client A to use when communicating with other users. This key is used to encrypt calls between Client A and the portal 15. Another key is provided to client B to encrypt calls between Client B and the portal 15.

Continuing to refer to FIG. 1, now that Client A is registered, Client A can make a VoIP call to Client B. Client A makes a request to talk to Client B through the portal 15. The portal 15 locates Client B and notifies Client B that Client A wishes to communicate. If Client B accepts, then the portal 15 sets up a secure communication channel between Client A and Client B. It should be noted that there could be an option to allow a non-encrypted channel. In this mode, both clients must agree that the end-to-end channel will not be encrypted before a connection is set up. The only difference between the encrypted scenario and the non-encrypted scenario is that a connection from one or both client(s) to the portal 15 will not be encrypted.

When Clients A or B are finished, they hang up and the portal 15 stops routing the information between Clients A and B. Finally, if Client A wants to deregister, Client A hangs up—disables the network connection, and the portal 15 is transparently notified that Client A wishes to deregister. When the portal 15 receives a deregister or cannot communicate with Client A due to a network disconnection from the IP compatible network, the portal 15 marks Client A as lost and can no longer locate Client A for other users.

In order to implement the above described scenarios, the system utilizes at least one control channel and one or more data channels for information flow. The control channel preferably utilizes a one time pad, and the control channel is used to obtain the keys. Preferably, data is sent over the control channel using Transmission Control Protocol (TCP)/Secure Socket layer (SSL) protocols. The voice or data packets are preferably sent over one or more data channels utilizing the User Datagram Protocol (UDP). The data channel is the preferred channel for transmitting the encrypted voice or data. The preferred protocol stack for the system includes
data compression, encryption, forward error correction, and data striping.

Figure 2:
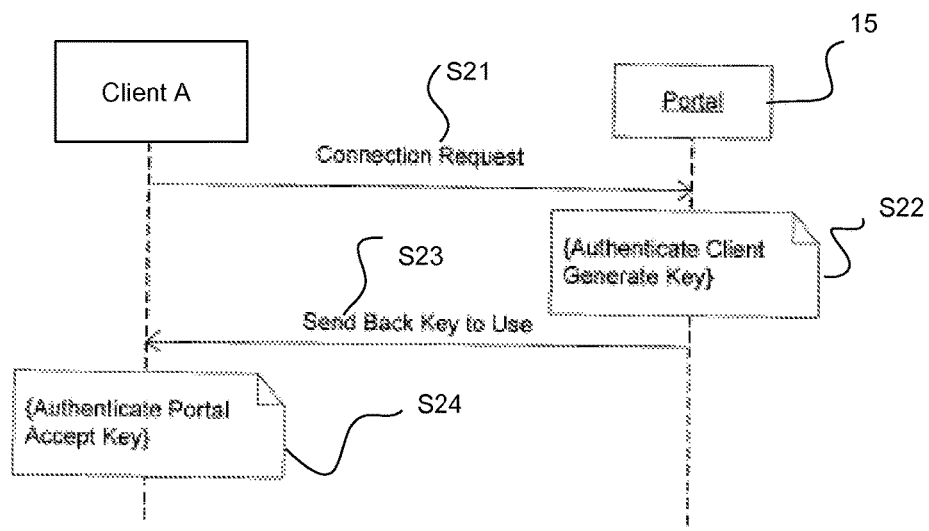
FIG. 2 is a call flow diagram of the registration process for a client that wants to initiate an encrypted telephone call.

The registration process will now be described in more detail using the call flow diagram of FIG. 2. Before a user of the system can communicate with anyone else the user must first register with the communications portal 15. As mentioned above, this registration is transparent to the user, and the purpose of registration is to allow the portal 15 to locate users and to set up a connection between two users when a connection request is made. The setup is preferably done on the control channel. The user must already have a certificate that is signed by a valid certificate authority, and the user must also have the server's certificate. In step S21 of FIG. 2, Client A sends to the portal 15 a request for connection. In step S22, the portal 15 authenticates the identity of Client A, and authenticates that the certificate of Client A is valid. Once a client registers, the portal 15 drops all previously known information about the client. In step S22, for example, the portal 15 would also generate an AES key. The key may be generated at the time of registration and used for subsequent calls. The key may also be changed on a periodic basis or changed as often as every time a new call is set up. In step S23, the portal 15 sends back an AES key to use until the client deregisters or until the key is changed. In step 23, Client A then accepts the key, if the portal 15 identity is verified. Client A decrypts with a private key and with a server public key, if a random sequence matches the random sequence sent in step S23. It should be noted that Client A preferably keeps the control channel open until Client A wants to leave and "deregister" from the portal 15.

Figure 3:
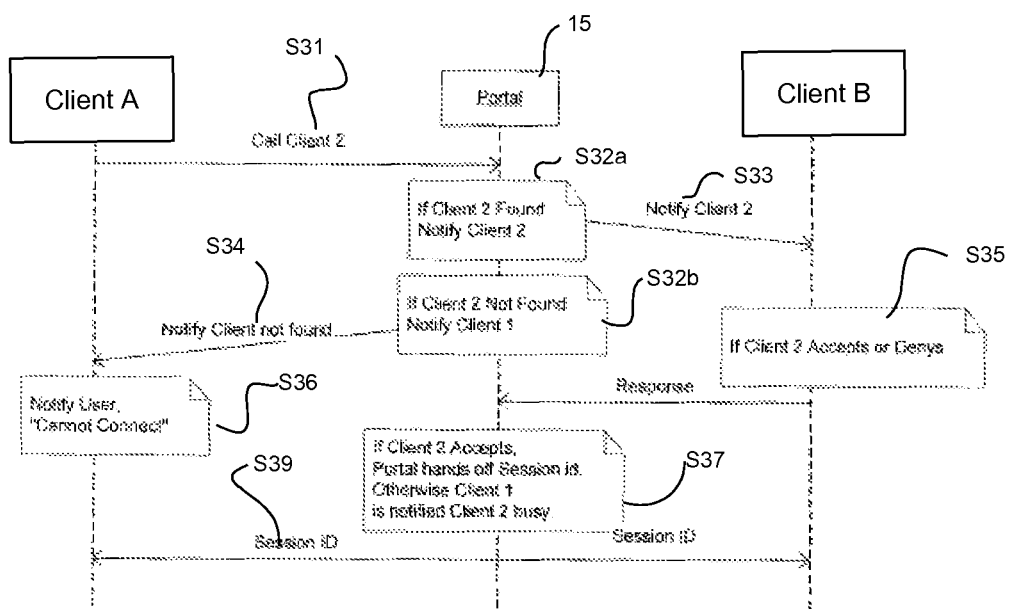
FIG. 3 is a call flow diagram illustrating the call setup that is done under the control of a portal.

A more detailed description of the call setup will now be provided. Before any client can communicate with another client, they must both agree to allow the portal 15 to set up a connection with the other client in accordance with the call flow illustrated in FIG. 3. This call set up is done using the control channel. For example, in step S31 Client A calls Client B by sending a request to connect to Client B via a "phone number" through the portal 15. The portal 15 searches for Client B. If Client B is found in step S32a, the portal 15 notifies Client B of the Client A's request in step S33. If Client B is not found in step S32b, Client A is notified Client B is not found in step S33. If Client B is found, Client B then chooses whether to accept or deny the request for a connection in step S35. If Client B accepts, the portal 15 notifies Client A that Client B has accepted the request in step S36. If the request is not accepted, Client A is notified in step S36 that Client B "cannot connect" or is busy. Client A is also notified that Client B cannot be connected if Client B is not currently a registered user. In step S37 the server at portal 15 decides whether the call can be completed. If the call can be completed, the server at portal 15 distributes a session ID to both Clients A and B in step 37 to use when sending messages.

Figure 4:
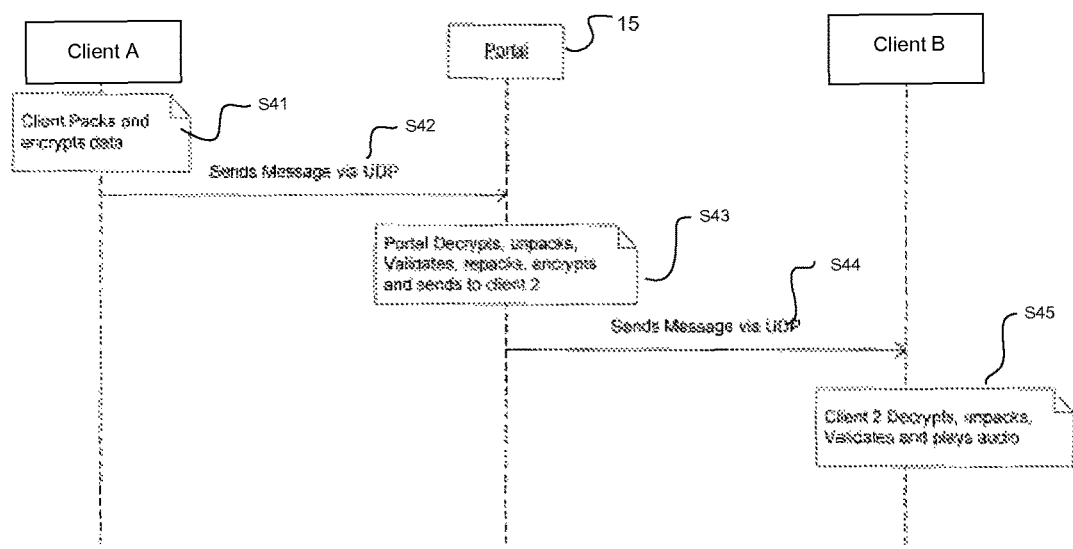
FIG. 4 is a call flow diagram illustrating the transmission of encrypted voice or data from Client A to Client B.

Once a connection is established, Clients A and B can send information to each other as illustrated in the call flow diagram of FIG. 4, which illustrates information traveling in only one direction from Client A to Client B. In actuality, there is information sent symmetrically in both directions. It should be noted that this flow of information within the diagram occurs on the data channel(s). In step S41, Client A packs and encrypts the voice or data. In step S42 Client A sends the encrypted voice or data to portal 15 via a protocol such as UDP or some other suitable protocol. In step S43, the portal 15 decrypts, verifies sequence number increasing, and signature matches data using Client A's public key. The portal 15 then re-encrypts the voice or data, and in step S43 the portal 15 sends the encrypted voice or data to Client B via UDP. In step S45, Client B receives the voice or data packet from the portal 15, verifies an increasing sequence number, verifies portal 15 signature, and is now capable of playing or outputting an audio signal from the decrypted voice or data packets.

Figure 5:
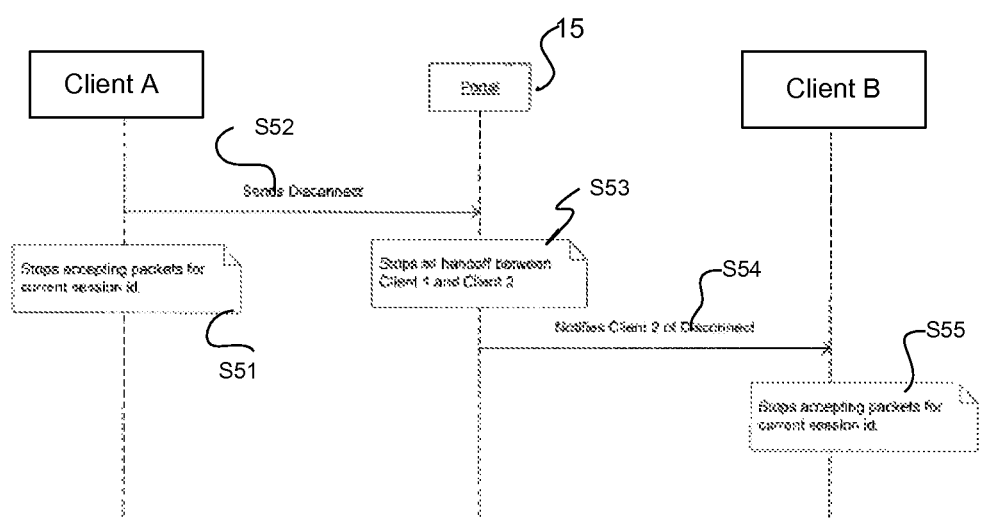
FIG. 5 is a call flow diagram illustrating the disconnection of a client from the network.

Referring now to FIG. 5, a call flow diagram illustrates in more detail how the Clients A and B can disconnect. When Client A and B are done talking, the clients are capable of disconnecting. This is similar to hanging up the phone, and the disconnection is performed on the control channel. For example, Client A notifies the portal 15 that "I'm done". In step S51, Client A stops accepting packets for the current ID session, and then notifies portal 15 by sending a disconnect message in step S52. In step S53, the portal 15 stops all handoff between Client A and Client B. The portal then notifies Client B that Client A is "Done", by sending Client B a notification of the disconnection in step S53. In step S55, Client B stops accepting packets for the current ID session.

Deregistration can happen in two ways, either by the Client manually disconnecting their application from the server, for example by hanging up, or the communication channel is lost due to being too far away from a base station or a wireless or terrestrial access point. Alternatively, the client may close the control channel or the channel is lost because of a weak signal. In these situations, the portal 15 detects that connection is lost, and terminates all active communications with the client.

Figure 6:
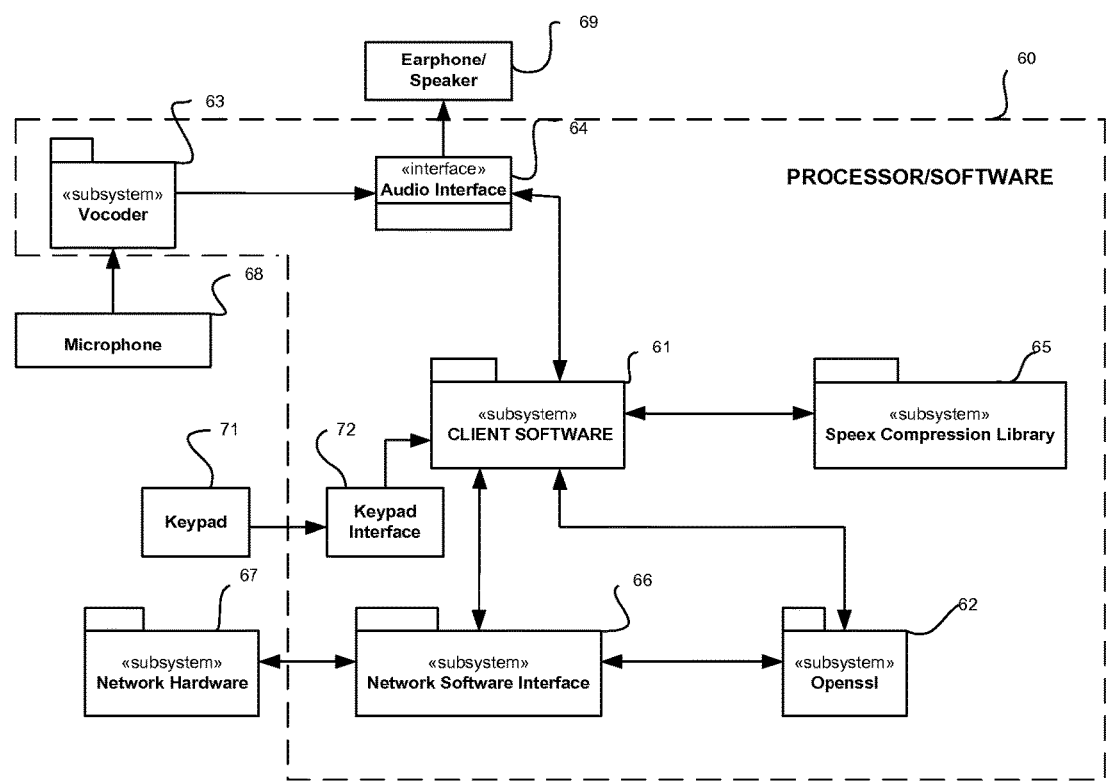
FIG. 6 is a block diagram of the data flow in a digital device or cell phone adapted for use with the present invention.

Referring now to FIG. 6, a block diagram illustrates the data flow of speech packets in a digital device or cell phone adapted for use with the present invention. The digital device includes a processor. The flow of data in the digital device or cell phone is two way. In other words, the digital device or cell phone converts speech into a digital signal and outputs an encrypted digitized speech signal to the network, or the digital device or cell phone receives an encrypted digitized speech signal from the network and outputs an audible sound. The digital device of FIG. 6 preferably has the ability to access the Internet and the ability to download a software application that enables it to send and receive the encrypted digitized speech signals. The downloadable software application can be preferably be downloaded to the digital device, for example, using Microsoft's ActiveSynch software, downloaded from the airwaves or terrestrial communication link, or via some other software application suitable loading executable programs on to a digital device. The downloading is preferably done under the control of a service provider who can issue a digital certificate for the digital device. The issuance of digital certificates prevents the unauthorized use of digital devices that have been compromised, lost or stolen.

The downloadable software application preferably includes a Graphical User Interface (GUI) that is based on Trolltech's QT or some other similar software development toolkit. Beneath the GUI are a number of software modules, including a processor 60 and a client software module 61 which can be based upon the client server architecture described in U.S. Patent Publication 2003/0007121 or some other suitable client server architecture. The client software module 61 controls the flow of data within the digital device, and it is responsive to a keyboard 71 and a keyboard interface 72. The client software is also responsive to a vocoder 63 for encoding speech into a digitized speech signal. The vocoder is responsive to a microphone 68 and coverts the user's speech into a digitized speech signal. The digitized speech signals are sent to an audio interface 63, such as Microsoft's waveform audio interface which can convert the digitized speech signals into the popular WAV format. When the audio interface 63 receives digitized speech signals from the client software 61 for output, the audio interface 63 converts the digitized speech signals into a format suitable for driving a speaker or earphone 69.

The client software module 61 also functions with an SSL module 62 which is preferably based on OpenSSL or a suitably modified version or derivative of OpenSSL or other SSL software. The SSL software may need to be modified depending upon the operating system, such as Windows Mobile or Linux, utilized by the digital device. The SSL module 62 runs authentication and encryption routines. The SSL module 62 is compatible with a root authority which signs out certificates for servers and clients and which enables the hand out and exchange of keys. The client software module 61 also functions with a compression library 65 which may preferably include the open source Speex library or any other suitable compression library. The compression library 65 either extracts incoming digital speech packets or compresses outgoing digital speech packets. The compressed digital speech packets are either input to or output from the digital device through the network hardware 67 and network software interface 66. The network hardware 67 establishes a connection to the portal 15 via any suitable IP compatible network. The voice or data that is the transmitted to the portal 15 is used to setup and teardown calls to the digital device.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather, the disclosure extends to all functionally equivalent structures, methods, and uses such as are within the scope of the appended claims.

We claim:

1. A method for transmitting real-time end-to-end encrypted software based voice communications, between at least a first digital or computing device with software program installed and a second digital or computer device which also has software installed, interfacing with a portal, or gateway or proxy or server, or other types of digital or computing device designed to process requests and deliver voice using different types of communications medium or protocol, comprising of:

receiving at the portal a request from the first digital or computing device to communicate with the second digital or computing device;

registering and/or authenticating at least the first digital or computing device and the second digital or computing device at a portal;

receiving authorization from the second digital or computing device to set up a secure session with the first digital or computing device;

providing the first digital or computing device and the second digital or computing device with at least first and/or second encryption keys, with one or more of the following functionality;

receiving real-time software based voice messages which have been encrypted from the first digital or computing device and the second digital or computing device;

real-time decrypting at the portal, the encrypted voice messages with the keys provided to the first digital or computing device and the second digital or computing device;

re-encrypting at the portal, the received messages which were decrypted real-time from the first digital or computing device and the second digital or computing device with the provided encryption keys;

sending the re-encrypted messages in real-time to the first digital or computing device and the second digital or computing device;

wherein the first digital device and the second device securely communicate in real-time with each other by encrypting and decrypting the messages sent to and received from the portal;

wherein AES (Advanced Encryption Standard) or other type of encryption algorithm, applying either hashing, symmetric or asymmetric methods, is utilized to encrypt the payload (data packets) in transit between the first digital or computing device and the second digital or computing device;

the portal re-encrypts encrypted messages which were decrypted by the portal; the portal assigns separate keys to each end point—for use of different types of encryption, one of which is symmetric, between the end point and portal; The portal re-encrypts and routes to a destination with destination's keys whereas the received message is decrypted using source's key; there are five functions to the portal of which one or more applies; the portal:

a. registers devices and/or users based on credentials
b. authenticates devices and/or users based on credentials
c. authorizes devices and/or users based on credentials
d. exchanges encryption keys with client 2 once devices and/or users are authorized and authenticated using different types of encryption, Handles call setup and call handoff
e. ensures that users have the correct encryption keys in order to operate a voice encrypted session;

wherein the overall method comprises:

1. a portal accepts incoming registration or authentication requests or call request for client software programs or devices;

2. a client registers:

a. when the client registers Secure Socket Layer (SSL), Transport Layer Security (TLS) or other standard security technology is used, for establishing an encrypted link or secure channel that is opened using both a client side and portal side certificate so that the client authenticates with the portal and the portal authenticates the client which is based on using different types of encryption methods, of which standard PKI (Public Key Infrastructure) practices is one such method;

b. once the secure channel is established, the client registers his/her 'phone number' and/or internet protocol address with the portal and the portal gives the client a generated key through the secure channel to be used in the voice encryption or let the client devices coordinate keys through using different types of encryption methods;

3. other clients register:

a. client 1 wishes to talk to client 2; client 1 requests the portal to setup a call with client 2;

b. the portal searches for client 2 and notifies client 2 of a call; If client 2 accepts, the portal notifies both clients to start flowing voice or data traffic through the portal;

4. clients use Voice over IP (VoIP) or other similar technologies to communicate end-to-end.

2. A method for transmitting real-time end-to-end encrypted software based voice communications, directly between at least a first digital or computing device with software installed computer program and a second digital or computing device which also has software program installed, comprising of:

registering and/or authentication at least the first digital or computing device and the second digital or computing device with each other in peer to peer communications;

providing the first digital or computing device and the second digital or computing device with at least first and second encryption keys with one or more of the following functionality;

receiving a request from the first digital or computing device to communicate with the second digital or computing device;

receiving authorization from the second digital or computing device to set up a secure session with the first device;

receiving real-time software based voice messages which have been encrypted from the first digital or computing device and the second digital or computing device; real-time decryption of the encrypted messages with the keys provided from each respective digital or computing device or from other technologies, of which PKI is one such technology, to the first digital or computing device and the second digital or computing device;

sending the encrypted voice messages in real-time to the first digital device and the second device;

wherein the first digital or computing device and the second digital or computing device securely communicate in real-time with each other by encrypting and decrypting the messages sent to and received from each digital or computing device;

wherein AES (Advanced Encryption Standard) or other type of encryption algorithm, of which symmetric or asymmetric encryption algorithm are utilized to encrypt the payload (data packets) in transit between the first digital or computing device and the second digital or computing device;

keys are generated per session in the first device for encrypting the communication session between the first digital or computing device and the second digital or computing device using different types of encryption key scheme; the received message is decrypted using source's key; there are five functions performed by one or the other device in a peer-to-peer or equivalent communications manner; one or more of the following apply:

a. registers devices and/or users based on credentials b. authenticates devices and/or users based on credentials C. Authorizes devices and/or users based on credentials d. exchanges encryption keys once devices and/or users are authorized and authenticated using type of encryption that was selected e. end devices handle call setup wherein the overall system comprises:

1. a first digital or computing device and a second digital and computing device which accept incoming registration and/or authentication requests or call request for client software programs or devices;

2. a client registers:

a. when a client registers Secure Socket Layer ("SSL"), Transport Layer Security (TLS) or other standard security technology is used, for establishing an encrypted link or secure channel that is opened using a client side and/or peer client side certificate so that the client authenticate the other client which is based on using different types of encryption methods, either public or private encryption types;

when the client registers Secure Socket Layer (SSL), Transport Layer Security (TLS) or other standard security technology is used, for establishing an encrypted link or secure channel that is opened using both a client side and portal side certificate so that the client authenticates with the portal and the portal authenticates the client which is based on using different types of encryption methods, of which standard PKI (Public Key Infrastructure) practices is one method;

b. once the secure channel is established the client registers his 'phone number' with the end client providing the client a generated key through the secure connection to be used in the voice encryption or let the client devices coordinate keys through using different types of encryption methods, which are public or private encryption methods;

3. other clients register:

a. client 1 wishes to talk to client 2; client 1 generates setup a call with client 2;

b. client 1 searches for client 2 and notifies client 2 of a call; if client 2 accepts, both clients start flowing voice traffic;

4. clients use Voice over IP (VoIP) or other similar technologies to communicate end-to-end.

3. The method for transmitting real-time end-to-end encrypted software based voice or data or game consoles, or video players incorporating DVD, Blu-ray, Red Laser, Optical, and/or streaming technologies, or video, or video teleconferences or other network-connected appliances type of communications, between at least a first digital or computing device with software installed (computer program) and a second digital or computing device which also has software application installed, interfacing with a portal according to claim 1, or peer to peer in accordance to claim 2 to deliver using any-type different types of communications for two or more multiple recipients.

* * * * *